Patented Nov. 10, 1953

2,658,843

UNITED STATES PATENT OFFICE 2,658,843

METHOD OF RENDERING REGENERATED CELLULOSE RESISTANT TO STICKING AND ARTICLE PRODUCED

William O. Brillhart, Fredericksburg, Va. assignor to American Viscose Corporation, Wilmington, Del., a corporation of Delaware No Drawing. Application July 25, 1950,
Serial No. 175,892

8 Claims. (Cl. 117—144)

This invention relates to improvements in smooth, non-fibrous, non-porous sheets and films. More particularly, the invention relates to the production of cellulosic pellicles which have been treated with an anti-sticking agent. The invention will be described in terms of regenerated cellulose film, but it should be understood that this is intended merely to be illustrative and not limitative.

This application is a continuation-in-part of my copending application Serial No. 119,995, filed October 6, 1949, now Patent 2,621,135, issued December 9, 1952.

In the manufacture of regenerated cellulose film, such as cellophane, prepared from an aqueous alkaline solution of sodium cellulose xanthate, it is necessary to maintain a certain predetermined moisture content in the film in order to produce a tough plastic film. Regenerated cellulose film will absorb moisture from the surrounding atmosphere and thereby render itself plastic when the relative humidity is sufficiently high. It is generally the practice, in order to render the regenerated cellulose film plastic at all relative humidities, to incorporate therein a hygroscopic plasticizing compound such as glycerol, glycol, or sorbitol, and the like. However, at high relative humidities the amount of moisture absorbed by the film is more than necessary to attain the desired plasticity and superimposed sheets have a tendency to stick together.

In the past the difficulty of sheets of regenerated cellulose sticking together has been overcome by coating the same with an anti-sticking lacquer. However, this necessitates an extra step in production and consequently increased cost. To overcome this the film has been impregnated, while in the wet gel state, with an anti-sticking or "slip" agent such as stearamide, which is usually applied in conjunction with the plasticizer, just prior to drying.

"Slip" as used herein designates the amount of friction, or lack of it, between adjacent surfaces of superimposed regenerated cellulose films or sheets and is designated quantitatively by the coefficient of friction of two surfaces of film when subjected to a load of approximately one pound per square inch and acted on by a force at right angles to the applied load.

Stearamide is disadvantageous due to its high melting point and poor solubility. It is difficult to prepare a water emulsion or dispersion of the same. A high temperature is necessary and the emulsifiers, which must be employed, are affected by the hardness formers found in normal water thus leading, after a certain period of time, to an undesirably streaked film.

It is known that films of regenerated cellulose, and the like, can be prepared having excellent blocking resistance and printability by the application of aqueous silica dispersions to the gel films before the drying process or to the rewet films. However, films so treated, tend to have a harsh feel, or "hand," and to be somewhat brittle when flexed.

Further, upon the application of a cationic surface active material containing a long carbon chain to regenerated cellulose film, and the like, a film of increased softness and toughness is produced. Consequently much work has been done to combine the desirable properties of both of the above types of treatment, namely silica and a cationic surface active material. However, the common types of dispersed silica, prepared by grinding or milling or by ion exchange from sodium silicate, are stable to anionic or nonionic surface active agents but not to cationics. The addition of cationic materials to this type of silica dispersion results in the immediate flocculation of all the silica present.

It is known to prepare a dispersion of silica by the acid-catalyzed hydrolysis of ethyl silicate, but this reaction takes place only in the presence of substantial amounts of mineral acids and uneconomical quantities of a mutual solvent for the ethyl silicate and the water and the acid necessary to carry out the reaction. In addition, the acid has a detrimental effect on film properties and its neutralization results in the formation of undesirable inorganic salts.

However, it has now been found that a dispersion of a hydrolyzable silicate combined with a cationic surface active material can be prepared by using the cationic material as an emulsifier for the hydrolyzable silicate. The resulting dispersion or emulsion when applied to non-fibrous films, imparts excellent anti-sticking properties thereto.

Accordingly, it is an object of the present invention to produce clear, smooth, non-fibrous, non-porous sheets and films having anti-sticking properties.

Another object of the invention is to produce clear, smooth, non-fibrous, non-porous sheets and films suffused with an aqueous dispersion of silica combined with a cationic surface active material.

Another object of the invention is to produce softened regenerated cellulose sheets and films suffused with an anti-sticking agent and resistant to sticking together.

Other advantages and objects of this invention will be apparent from the description hereinafter.

Regenerated cellulose film or sheet is cast from viscose, an alkaline solution of sodium cellulose xanthate prepared in conventional manner, desulfurized, bleached, plasticized and dried. This is accomplished by passing the film through successive baths, by means of rollers, containing the necessary materials, and in continuous operation. The film as it leaves the last or plasticizing bath before drying is wiped free of excess liquid by means of squeeze rolls, wiper blades, or the like.

The objects of the present invention are in general accomplished by incorporating in the plasticizer bath an anti-sticking agent which comprises an aqueous dispersion of silica combined with a cationic surface active material of the class of quaternary ammonium compounds having the general formula:

in which

R₁ denotes an alkyl group of at least 12 carbon atoms,
R₂ and R₃ denote alkyl groups of 1 to 20 carbon atoms,
R₄ denotes an alkyl group of 1 to 3 carbon atoms, and
X denotes an organic or inorganic anion such as Cl⁻, HSO₄⁻, CH₃SO₄⁻, etc.

These compounds are prepared by the exhaustive methylation of primary, secondary, or tertiary fatty amines, such as amines from hydrogenated tallow, octadecyl amine, heptadecyl amine, nonadecyl amine, methyl octadecyl amine, dimethyl octadecyl amine, etc., with an excess of methyl chloride or dimethyl sulfate, and the like, in a closed container at temperatures of 30 to 130° C. The primary, secondary, and tertiary fatty amines are easily prepared from the corresponding acids by well-known procedures.

Among the compounds particularly suited to the practice of the present invention may be listed octadecyltrimethylammonium chloride and dimethyldialkylammonium chloride where the alkyl group is that produced by the hydrogenation of tallow. These compounds are self-dispersible in water and act as emulsifiers for the hydrolyzable silicate.

The silica in the dispersions of the present invention may be derived from any hydrolyzable silicic acid ester, for example, the water-soluble esters such as ethylene glycol silicate, propylene glycol silicate, etc. However, the silica is preferably derived from ethyl silicates which are water-insoluble, such as tetraethyl orthosilicate, and the like. The two materials, i. e. the ethyl silicate and the cationic compound, may be mixed together, or melted together if the cationic compound is a solid, before being added to water, or the water may be heated and the cationic compound dispersed therein before the ethyl silicate is added, or the emulsion of the cationic compound may be cooled to a moderate temperature before the silicate is added.

As illustrative of the present invention, the following preferred embodiment is given. 10 parts of dimethyl dialkyl (the mixed hexadecyl and octadecyl radicals obtained by the hydrogenation of tallow) ammonium chloride were emulsified in 100 parts of water at 65° C. The emulsion was cooled with stirring to 45–50° C. and then 5 parts of tetraethyl orthosilicate were added with vigorous stirring. The emulsion was then allowed to stand 24 hours to complete the hydrolysis of the silicate to silica at the end of which time it was ready for use. The emulsion was then added to the plasticizer bath, which contained 5% glycerol, to give a solids content of anti-sticking agent in the bath of 0.5%, and regenerated cellulose film in the wet gel state was passed therethrough. The excess of the bath was removed by means of squeeze rolls, or wiper blades, and the film dried in the usual manner. The resulting film showed no tendency to stick when sheets of the same were superimposed. Sheets were stacked in an oven under pressure at 120° F. for 16 hours and when removed from the oven, the sheets fell apart freely showing no tendency whatever to stick together. The film was also considerably tougher than the conventionally prepared film and did not yellow on exposure to light.

Solutions, emulsions and dispersions of the class of compounds having the above-identified generic formula are applicable in the preparation of the anti-sticking agents of the present invention. The percent solids of the anti-sticking agent in the plasticizer bath may be varied between 0.05 and 2.5%. In preparing the anti-sticking agent, or the silicate-cationic mixture, the ethyl silicate may be varied from 1 to 75%.

The anti-sticking agents of the present invention are substantially non-foaming and consequently eliminate many troublesome problems often encountered with other materials, such as streaking of the film, etc. These anti-sticking agents are also insensible to hard water thus avoiding the danger of the formation of deleterious salts which cause streaking of the film and contamination of the bath. The anti-sticking agents are stable on storage and the pH of their aqueous dispersions can be readily varied within the range of 5.0 to 9.0 without ill effects.

While the present invention is concerned chiefly with an anti-sticking agent comprising a silicate-cationic compound mixture, the cationic compounds, having the above-identified generic formula, are in and of themselves useful anti-sticking agents for non-fibrous, non-porous films and sheets. As an illustration, the following example is given: a 5–10% dispersion in water of octadecyltrimethylammonium chloride was prepared by adding the same to water at room temperature, or higher if desired to speed up the rate of dispersion, with stirring. The resultant dispersion was then added to the plasticizer bath, which contained 5% glycerol, to give a solids content of anti-sticking agent in the bath of 0.5%, and regenerated cellulose film in the wet gel state was passed therethrough. The excess of the bath was removed by means of squeeze rolls, or wiper blades, and the film dried in the usual manner. The resulting film showed no tendency to stick when sheets of the same were superimposed and sheets that were stacked in an oven under pressure at 120° F. for 16 hours fell apart freely when removed therefrom and showed no tendency whatever to stick together. The same procedure was followed using a dispersion of dimethyldialkylammonium chloride (where the alkyl group was that produced by the hydrogenation of tallow) with the same desirable results. These cationic compounds, and their use alone as anti-sticking agents for smooth, non-fibrous, non-porous sheets and films, have been described and claimed in my copending application S. N. 119,995, filed October 6, 1949, now Patent 2,621,135, issued December 9, 1952.

It is preferred to apply the anti-sticking agent to the regenerated cellulose sheet or film while in the wet gel state, prior to any dehydration thereof, from the plasticizer or softener bath, the advantage being very little increase in cost and conventional equipment may be used with no change in the same. However, if desired, the anti-sticking agent may be applied subsequent to the addition of plasticizer to the regenerated cellulose film and prior to the drying step by means of dip rolls, sprays, or the like. When this method of application is employed, a higher solids content of anti-sticking agent in the bath must be employed due to the shorter contact time of the film with the bath. That is to say that the percent solids in the bath would more closely approximate 2.5% solids.

The anti-sticking agent may also be applied after the film has been completely dried but preferably before it has been dried below 69% moisture content. However, here the film must be re-wet and then dried resulting in an extra step and increased cost of production.

The present invention is further advantageous in that the application of anti-sticking agents from an aqueous solution, emulsion, or dispersion is accomplished on the film-casting machine, thus attaining a considerable saving in labor, equipment and materials over the former method of application which, as previously referred to, consisted of drying the film and coating the same with an organic solvent solution of the anti-sticking agent on a separate machine in a separate operation.

Regenerated cellulose film suffused with the anti-sticking agents of the present invention exhibit remarkably good printing properties, that is, it is more conducive to printing than ordinary regenerated cellulose film.

Further, the present invention combines the anti-sticking, or anti-blocking, properties of silica-treated films at high relative humidities and their receptiveness to oil inks and aqueous adhesives with the toughness and soft "hand" of films processed with cationics.

Although the invention has been discussed in detail in connection with the sizing of regenerated cellulose film or pellicles, it is also applicable to other smooth, non-fibrous, non-porous sheets and films which, due to their general nature, have a tendency to stick together, and especially water sensitive sheets, film, or pellicles cast from aqueous or aqueous alkaline cellulosic solutions, such as those of low-substituted cellulose ethers, esters, and ether-esters such as glycerol cellulose, methyl cellulose, ethyl cellulose, cellulose glycollic acid, cellulose phthalic acid, and the like.

It is to be understood that the description above is merely illustrative and that changes and variations may be made without departing from the spirit and scope of the invention as defined in the appended claims.

I claim:

1. A method of rendering regenerated cellulose film resistant to sticking which comprises treating said film while in the wet gel state with an aqueous bath containing a hydrolyzed organic ester of silicic acid and a compound having the general formula:

where $R_1$ is an alkyl group of at least 12 carbon atoms, $R_2$ and $R_3$ are alkyl groups of 1 to 20 carbon atoms, $R_4$ is an alkyl group of 1 to 3 carbon atoms, and X is a radical selected from the group consisting of organic and inorganic anions.

2. A method as defined in claim 1 in which the organic ester of silicic acid is an ethyl silicate.

3. A method as defined in claim 1 in which the organic ester of silicic acid is an ethylene glycol silicate.

4. A method as defined in claim 1 in which the organic ester of silicic acid is a propylene glycol silicate.

5. A method as defined in claim 1 in which the aqueous bath has a solids content of 0.05 to 2.5%.

6. A method of rendering regenerated cellulose film resistant to sticking which comprises treating said film while in the wet gel state with an aqueous bath containing a water-soluble polyhydroxy alcohol as a softening agent for the regenerated cellulose, a hydrolyzed organic ester of silicic acid, and a compound having the general formula:

where $R_1$ is an alkyl group of at least 12 carbon atoms, $R_2$ and $R_3$ are alkyl groups of 1 to 20 carbon atoms, $R_4$ is an alkyl group of 1 to 3 carbon atoms, and X is a radical selected from the group consisting of organic and inorganic anions.

7. As an article of manufacture a smooth, a non-fibrous, non-porous, non-sticking cellulosic film suffused with colloidal silica and a compound having the general formula:

where $R_1$ is an alkyl group of at least 12 carbon atoms, $R_2$ and $R_3$ are alkyl groups of 1 to 20 carbon atoms, $R_4$ is an alkyl group of 1 to 3 carbon atoms, and X is a radical selected from the group consisting of organic and inorganic anions, said article having been made by the process of claim 1.

8. As an article of manufacture a smooth, non-fibrous, non-porous, non-sticking cellulosic film suffused with a composition comprising a polyhydroxy alcohol as a softening agent for the film, a colloidal silica, and a compound having the general formula:

where $R_1$ is an alkyl group of at least 12 carbon atoms, $R_2$ and $R_3$ are alkyl groups of 1 to 20 carbon atoms, $R_4$ is an alkyl group of 1 to 3 carbon atoms, and X is a radical selected from the group consisting of organic and inorganic anions, said article having been made by the process of claim 6.

WILLIAM O. BRILLHART.

References Cited in the file of this patent

UNITED STATES PATENTS

| Number | Name | Date |
|---|---|---|
| 2,008,815 | Brandenberger et al. | July 23, 1935 |
| 2,042,702 | Dreyfus | June 2, 1936 |
| 2,206,046 | Pollard | July 2, 1940 |
| 2,226,554 | Drew | Dec. 31, 1940 |
| 2,243,682 | Reynolds | May 27, 1941 |
| 2,375,261 | Taylor et al. | May 8, 1945 |
| 2,408,656 | Kirk | Oct. 1, 1946 |
| 2,431,873 | Kennelly | Dec. 2, 1947 |
| 2,443,512 | Powers | June 15, 1948 |
| 2,524,358 | Robey | Oct. 3, 1950 |
| 2,527,329 | Powers | Oct. 24, 1950 |